(12) United States Patent
Zhao et al.

(10) Patent No.: US 12,284,668 B2
(45) Date of Patent: Apr. 22, 2025

(54) SERVICE CONFLICT SOLUTION METHOD, APPARATUS AND DEVICE, AND STORAGE MEDIUM

(71) Applicant: GUANGDONG OPPO MOBILE TELECOMMUNICATIONS CORP., LTD., Dongguan (CN)

(72) Inventors: Zhenshan Zhao, Dongguan (CN); Huei-Ming Lin, South Yarra (AU); Yi Ding, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 265 days.

(21) Appl. No.: 17/865,947

(22) Filed: Jul. 15, 2022

(65) Prior Publication Data

US 2022/0353883 A1    Nov. 3, 2022

Related U.S. Application Data

(63) Continuation of application No. PCT/CN2020/072547, filed on Jan. 16, 2020.

(51) Int. Cl.
*H04W 72/566* (2023.01)
*H04W 72/121* (2023.01)
*H04W 72/1273* (2023.01)
*H04W 72/23* (2023.01)

(52) U.S. Cl.
CPC ....... *H04W 72/569* (2023.01); *H04W 72/121* (2013.01); *H04W 72/1273* (2013.01); *H04W 72/23* (2023.01)

(58) Field of Classification Search
CPC . H04W 72/569; H04W 72/23; H04W 72/121; H04W 72/1273
See application file for complete search history.

(56) References Cited

U.S. PATENT DOCUMENTS

2017/0055249 A1    2/2017  Yasukawa et al.
2019/0254009 A1*   8/2019  Hwang ............ H04W 72/0446

FOREIGN PATENT DOCUMENTS

| CN | 104429106 A | 3/2015 |
|---|---|---|
| CN | 107949998 A | 4/2018 |
| CN | 109496458 A | 3/2019 |
| CN | 110535555 A | 12/2019 |
| CN | 110583085 A | 12/2019 |
| EP | 3537822 A1 | 9/2019 |
| WO | 2017156788 A1 | 9/2017 |

OTHER PUBLICATIONS

Extended European Search Report issued in corresponding European application No. 20914405.4, mailed Nov. 25, 2022.

(Continued)

*Primary Examiner* — Natasha W Cosme
(74) *Attorney, Agent, or Firm* — BAYES PLLC

(57) ABSTRACT

A method for resolving service conflict includes: receiving, when time domain resources of a first physical downlink shared channel (PDSCH) and a second PDSCH overlap, at least one of the first PDSCH and the second PDSCH; wherein, the first PDSCH carries a first type of service, and the second PDSCH carries a second type of service.

19 Claims, 8 Drawing Sheets

(56) References Cited

OTHER PUBLICATIONS

Nokia et al., "On intra-UE DL/UL prioritization for NR URLLC", R1-1901917, 3GPP TSG RAN WG1 Meeting #96 Athens, Greece, Feb. 25-Mar. 1, 2019.
Sony, "Considerations on UL Intra-UE Tx Multiplexing", R1-1902182, 3GPP TSG RAN WG1 #96 Athens, Greece, Feb. 25-Mar. 1, 2019.
InterDigital Inc., "Priority indication", R1-1909415, 3GPP TSG RAN WG1 #98 Prague, CZ, Aug. 26-30, 2019.
Priority Review issued in corresponding Chinese application No. 202210963195.4, mailed Jul. 3, 2023.
First Office Action issued in corresponding Chinese application No. 202210963195.4, mailed Jul. 6, 2023.
"Scheduling/HARQ enhancement for eURLLC", R1-1910486, Source: Samsung, 3GPP TSG RAN WG1 #98bis, Chongqing, China, Oct. 14-20, 2019, 7 pages.
"Enhancement for Scheduling/HARQ", R1-1912033, Source: vivo, 3GPP TSG RAN WG1 #99, Reno, USA, Nov. 18-22, 2019, 7 pages.
International Search Report from the International Searching Authority Re. Application No. PCT/CN2020/072547, mailed Oct. 21, 2020, 4 pages.
Written Opinion of the International Searching Authority Re. Application No. PCT/CN2020/072547, mailed Oct. 21, 2020, 7 pages.
Second Office Action issued in corresponding Chinese application No. 202210963195.4, mailed Sep. 14, 2023.
Notice of Allowance issued in corresponding Chinese application No. 202210963195.4, mailed Nov. 30, 2023.
Notice of Allowance issued in corresponding European application No. 20914405.4, mailed Sep. 20, 2023.

* cited by examiner

SERVICE CONFLICT SOLUTION METHOD, APPARATUS AND DEVICE, AND STORAGE MEDIUM

CROSS-REFERENCE TO RELATED APPLICATION

This application is a continuation of International Application No. PCT/CN2020/072547, filed on Jan. 16, 2020, the entire contents of which are incorporated herein by reference.

TECHNICAL FIELD

This application relates to the field of mobile communications, and in particular to a method, an apparatus, a device and a storage medium for resolving service conflict.

BACKGROUND

In the new radio (NR) system, a network device schedules a physical downlink share channel (PDSCH) for a terminal, carries a service on the PDSCH, and sends the PDSCH to the terminal. The terminal receives the PDSCH, and then communicates with the network device.

In the related art, at the same time, the network device schedules only one PDSCH for the terminal, so that the terminal can receive the PDSCH.

When the network device schedules two PDSCHs for the terminal, the time domain resources of the two PDSCHs may overlap and conflict with each other. When conflict occurs between two PDSCHs, how the terminal receives the PDSCH becomes a problem that needs to be solved urgently.

SUMMARY

Embodiments of the application provide a method, an apparatus, a device and a storage medium for resolving service conflict, thereby proposing a technical solution when conflict occurs between two PDSCHs. The technical solution is exemplarily described as follows.

According to an aspect of the application, a method for resolving service conflict is provided. The method is applied to a terminal and includes:
  receiving, when time domain resources of a first PDSCH and a second PDSCH overlap, at least one of the first PDSCH and the second PDSCH; where the first PDSCH carries a first type of service, and the second PDSCH carries a second type of service.

According to an aspect of the application, a method for resolving service conflict is provided. The method is applied to a network device and includes:
  sending to a terminal, when time domain resources of a first PDSCH and a second PDSCH overlap, at least one of the first PDSCH and the second PDSCH;
  where the first PDSCH carries a first type of service, and the second PDSCH carries a second type of service.

According to an aspect of the application, a communication apparatus is provided, which is applied to a terminal and includes:
  a receiving module, configured to receive, when time domain resources of a first PDSCH and a second PDSCH overlap, at least one of the first PDSCH and the second PDSCH; where the first PDSCH carries a first type of service, and the second PDSCH carries a second type of service.

According to an aspect of the application, a terminal is provided. The terminal includes: a processor; a transceiver connected to the processor; and a memory configured to store executable instructions of the processor. The processor is configured to, through loading and executing the executable instructions, implement the method for resolving service conflict described in the foregoing aspect.

According to an aspect of the application, a computer-readable storage medium is provided. Executable instructions are stored in the computer-readable storage medium, and the executable instructions are loaded and executed by a processor to implement the method for resolving service conflict described in the foregoing aspect.

The technical solutions provided by the embodiments of the application at least include the following beneficial effects.

When the time domain resources of the first PDSCH and the second PDSCH sent by the network device to the terminal overlap, the terminal receives at least one of the first PDSCH and the second PDSCH. A new conflict resolution for receiving PDSCH is provided, which ensures that the terminal can receive the PDSCH correctly, thereby ensuring the validity of radio communication.

BRIEF DESCRIPTION OF THE DRAWINGS

In order to more clearly describe the technical solutions in the embodiments of the application, the following will briefly introduce the drawings that are used in the description of the embodiments. Obviously, the drawings in the following description illustrate only some embodiments of the application. For those of ordinary skill in the art, other drawings can be obtained based on these drawings without creative work.

DETAILED DESCRIPTION

In order to make the purpose, technical solutions, and advantages of the application clearer, some implementation examples of the application will be described in further detail below in conjunction with the accompanying drawings.

First, some terms involved in the embodiments of this application will be briefly described.

1. 5G

With users' pursuit of speed, latency, high-speed mobility, and energy efficiency, as well as the changing trend of service diversity and complexity in future life, 3rd generation partnership project (3GPP), an international standards organization, develops 5G. The main application scenarios of 5G include: enhanced mobile ultra-broadband (eMBB), ultra reliability and low latency communication (URLLC), and massive machine type communications (mMTC).

eMBB aims for users to obtain multimedia content, services and data, and its demand is growing very rapidly. On the other hand, since eMBB may be deployed in different scenarios, such as indoors, urban areas, rural areas, and the like, its capabilities and requirements vary greatly. Therefore, it cannot be generalized and needs to be analyzed in detail in conjunction with specific deployment scenarios. Typical applications of URLLC include: industrial automation, power automation, telemedicine operations (e.g., surgery), traffic safety protection, and the like. Typical characteristics of mMTC include: high connection density, small data volume, delay-insensitive services, low-cost modules and long service life.

2. RRC State

NR may also be deployed independently. In the 5G network environment, in order to reduce air interface signaling, quickly resume wireless connections, and quickly resume data services, a new radio resource control (RRC) state is defined, that is, the RRC_INACTIVE state. This state is different from the RRC_IDLE and RRC ACTIVE states.

In the RRC_IDLE state, the mobility includes cell selection and reselection based on user equipment (UE), paging is initiated by the core network (CN), and the paging area is configured by the CN. There is no UE access stratum (AS) context at the base station side, and there is no RRC connection.

In the RRC_CONNECTED state, there is an RRC connection, and there is UE AS context at the base station and the UE. The network side acknowledges that the location of the UE is of a specific cell level. The mobility is controlled by the network side, and unicast data can be transmitted between the UE and the base station.

In the RRC_INACTIVE state, the mobility includes cell selection and reselection based on UE, there is a connection between CN-NR, the UE AS context is stored at a certain base station, paging is triggered by the radio access network (RAN), the RAN-based paging area is managed by the RAN, and the network side acknowledges that the location of the UE is at a level of the RAN-based paging area.

Figure 1:
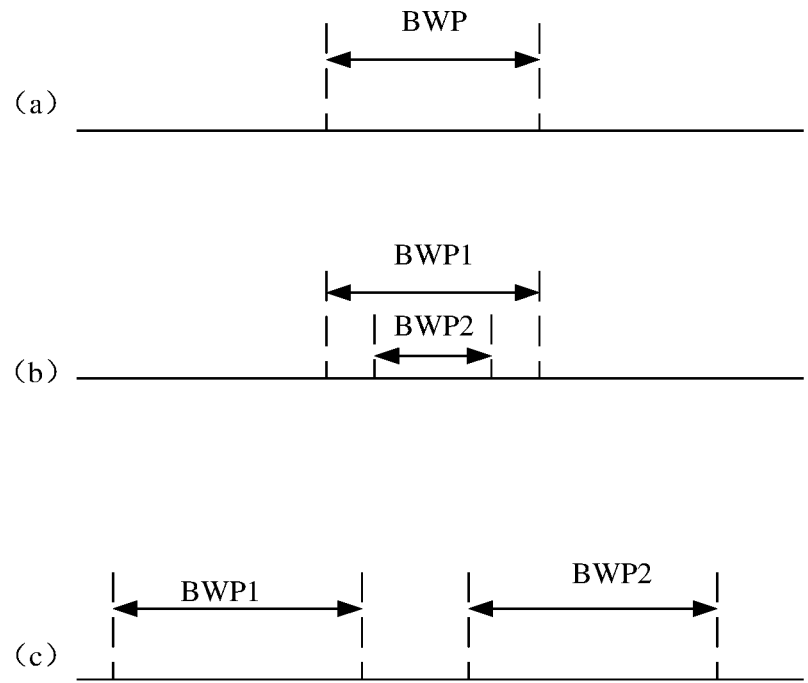
FIG. 1 is a schematic diagram of a bandwidth according to some examples of the application.

In the NR system, the maximum channel bandwidth (wideband carrier) may be 400 MHz, which is much larger than the maximum bandwidth of 20 MHz in the LTE system. If the terminal maintains working on the wideband carrier, it will cost a lot of power consumption. Therefore, it is recommended that the radio frequency bandwidth of the terminal can be adjusted according to the actual throughput of the terminal. In order to optimize the power consumption of the terminal, the bandwidth part (BWP) is introduced, as shown by the schematic diagram of bandwidth allocation in FIG. 1-a. If the terminal's speed requirement is very low, a small bandwidth may be configured for the terminal, as shown by BWP2 in FIG. 1-b. If the terminal's speed requirement is very high, the terminal may be configured with a relatively larger bandwidth, as shown by BWP1 in FIG. 1-b. If the terminal supports a high speed, or the terminal works in the carrier aggregation (CA) mode, multiple BWPs may be configured for the terminal, as shown by the schematic diagram of bandwidth allocation in FIG. 1-c.

3. MBMS

Multimedia broadcast multicast service (MBMS) is a service introduced in 3GPP Release 6. MBMS is a technology used for transmitting data from one data source to multiple UEs by sharing network resources. It can effectively use network resources while providing multimedia services, thereby achieving multimedia service broadcasting and multicasting with a relatively high rate (256 kbps).

Due to the low spectrum efficiency of MBMS in 3GPP R6, it is not sufficient to effectively carry and support the operation of mobile TV-type services. Therefore, in the long term evolution (LTE) project of the radio access network, 3GPP clearly proposes to enhance the ability to support downlink high-speed multimedia broadcast and multicast services, and determines the design requirements for the physical layer and air interface.

E-MBMS was introduced to the LTE network by R9. E-MBMS proposes the concept of single frequency network (SFN), in which data is transmitted in all cells at the same time by adopting a uniform frequency while ensuring synchronization between cells. In this way, the overall signal-to-noise ratio distribution of the cell can be greatly improved, and the spectrum efficiency can be greatly improved accordingly. Service broadcast and multicast is achieved based on the Internet protocol (IP) multicast protocol.

In LTE/LTE-A, MBMS is only provided with a broadcast carrier mode, without the multicast carrier mode.

The reception of MBMS service is applicable to UEs in the RRC_CONNECTED or RRC_IDLE state.

Figure 2:
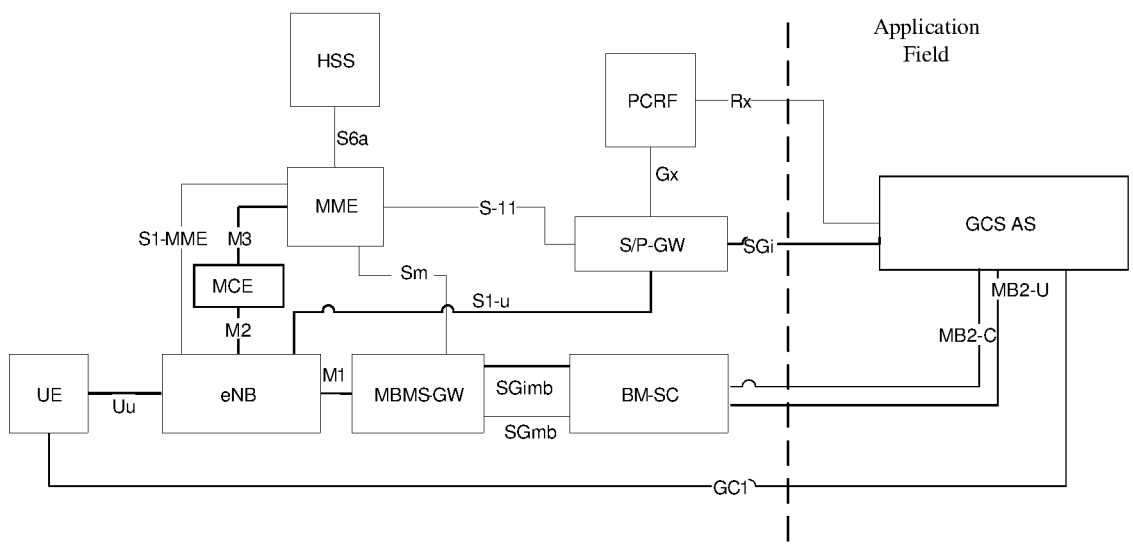
FIG. 2 is a schematic diagram of a framework of SC-PTM in R13 according to some examples of the application.

FIG. 2 is a schematic diagram of a framework of SC-PTM in R13 according to some examples of the application. As shown in FIG. 2, single cell point to multipoint (SC-PTM) is introduced in R13. SC-PTM is based on MBMS network architecture, and a multi-cell/multicast coordination entity (MCE) decides whether to adopt the SC-PTM transmission mode or the multimedia broadcast multicast service single frequency network (MBSFN) transmission mode.

Figure 3:
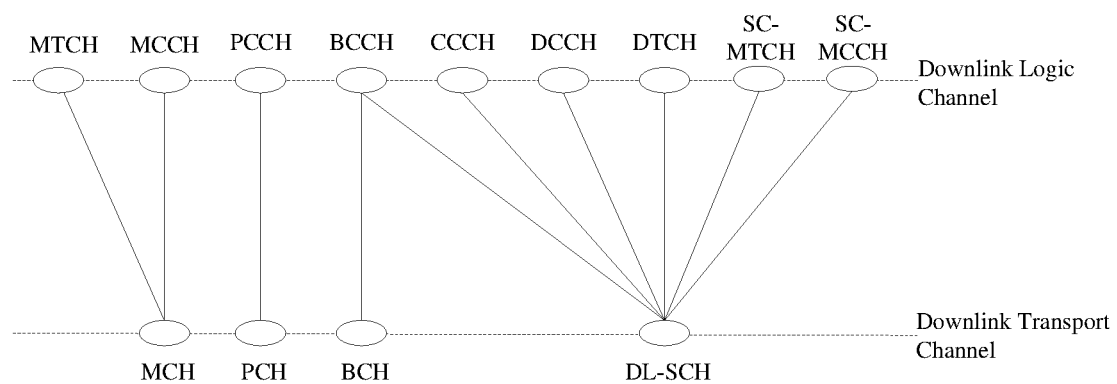
FIG. 3 is a schematic diagram of a mapping relationship between logical channels and transmission channel types according to some examples of the application.

FIG. 3 is a schematic diagram of a mapping relationship between logical channels and transmission channel types according to some examples of the application. Referring to FIG. 3, new logical channels: single cell multicast control channel (SC-MCCH, LCID=1001) and single cell multicast transport channel (SC-MTCH, LCID=1001), are mapped to the DL-SCH transport channel and the PDSCH physical channel. SC-MCCH and SC-MTCH do not support hybrid automatic repeat-request (HARQ) operation.

In addition, a new system information block (SIB) type, that is SIB20, is introduced for transmitting SC-MCCH configuration information, with only one SC-MCCH in one cell. The configuration information includes: modification period and repetition period of SC-MCCH, and configuration information of radio frame and subframe.

Figure 4:
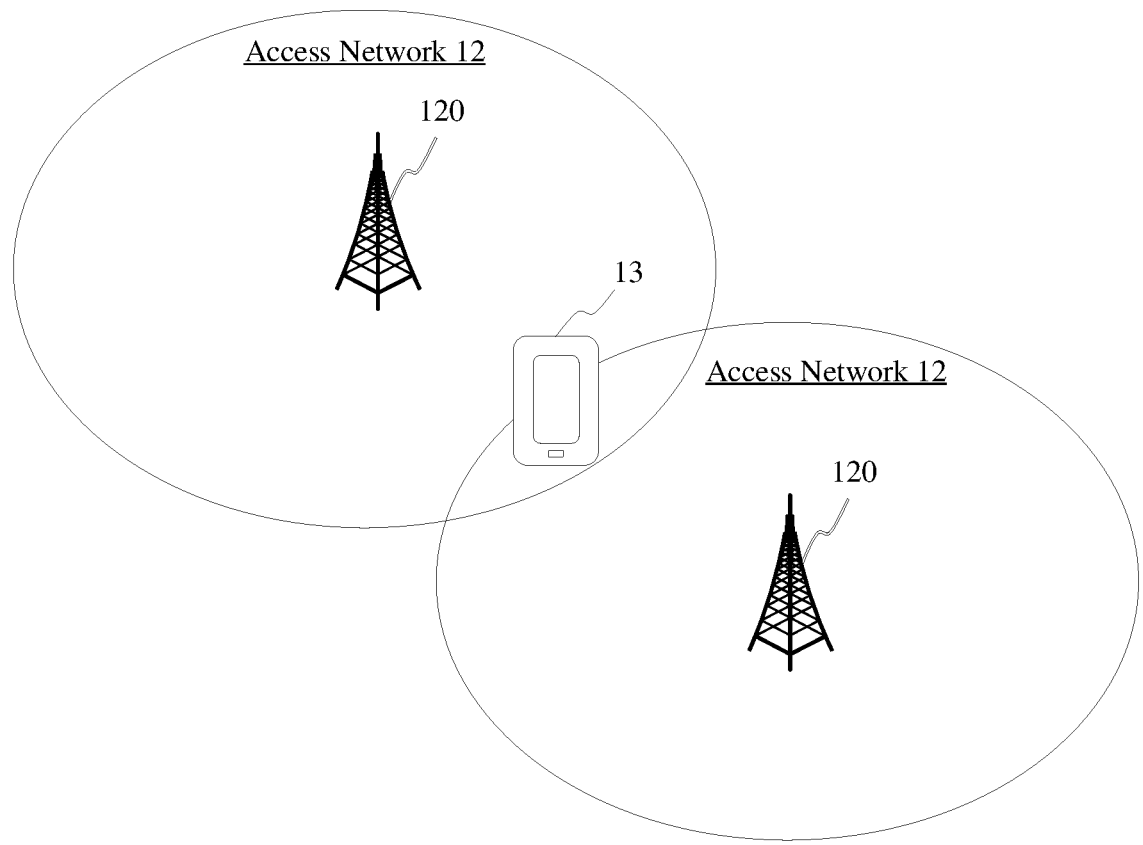
FIG. 4 illustrates a block diagram of a communication system according to some examples of the application.

FIG. 4 illustrates a block diagram of a communication system according to some examples of the application. The communication system may include an access network 12 and a terminal 13.

The access network 12 includes several network devices 120. The network device 120 may be a base station, which is a device deployed in the access network to provide the wireless communication function for the terminal. The base station may include various forms of macro base stations, micro base stations, relay stations, access points, and so on. In systems using different wireless access technologies, the names of devices with the function of base station function may be different. For example, in the LTE system, eNodeB or eNB is referred to. In the 5G NR-U system, gNodeB or gNB is referred to. With development of the communication technology, the description of "base station" may change. For convenience, in the embodiments of the application, the above-mentioned devices for providing wireless communication functions for the terminal 13 are collectively referred to as the access network devices.

The terminal 13 may include various handheld devices, vehicle-mounted devices, wearable devices, computing devices with wireless communication functions, or other processing devices connected to wireless modems, or various forms of user equipment, mobile stations (MS), terminal device and so on. For ease of description, the devices mentioned above are collectively referred to as terminals. The access network device 120 and the terminal 13 communicate with each other through a certain air interface technology, such as a Uu interface.

The technical solutions of the embodiments of this application can be applied to various communication systems, for example, global system of mobile communication (GSM) system, code division multiple access (CDMA) system, wideband code division multiple access (WCDMA) system, general packet radio service (GPRS), long term evolution (LTE) system, LTE frequency division duplex (FDD) system, LTE time division duplex (TDD) system, advanced long term evolution (LTE-A) system, new radio (NR) system, NR-evolved system, LTE-based access to unlicensed spectrum (LTE-U) system, NR-U system, universal mobile telecommunication system (UMTS), worldwide interoperability for microwave access (WiMAX) communication system, wireless local area networks (WLAN), wireless fidelity (WiFi), next-generation communication systems or other communication systems.

Generally speaking, traditional communication systems support a limited number of connections and are easy to be implemented. However, with the development of communication technology, mobile communication systems will not only support traditional communication, but also support, for example, device to device (D2D) communication, machine to machine (M2M) communication, machine type communication (MTC), vehicle to vehicle (V2V) communication, vehicle to everything (V2X) system, and the like. The embodiments of the application can also be applied to these communication systems.

Figure 5:
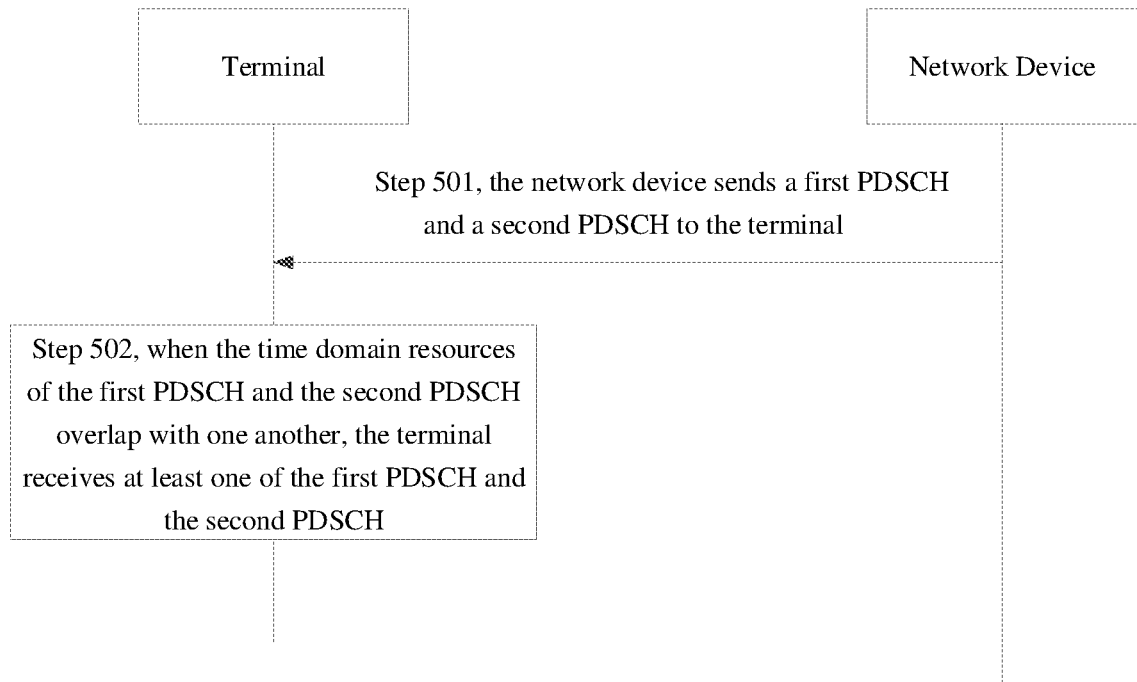
FIG. 5 illustrates a flowchart of a method for resolving service conflict according to some examples of the application.

FIG. 5 illustrates a flowchart of a method for resolving service conflict according to some examples of the application, which is applied to the terminal and network device shown in FIG. 4, and the method includes at least part of the following content.

In step 501, the network device sends a first PDSCH and a second PDSCH to the terminal.

In some examples, the first PDSCH carries a first type of service, and the second PDSCH carries a second type of service.

In addition, the first type of service and the second type of service may include the following three situations.

The first type of service includes a multicast service, and the second type of service includes a service other than the multicast service.

Alternatively, the first type of service includes a broadcast service, and the second type of service includes a service other than the broadcast service.

Alternatively, the first type of service includes a multicast service and a broadcast service, and the second type of service includes a service other than the multicast service and the broadcast service.

For example, the first type of service may be an MBMS service, and the second type of service may include unicast service, system message, paging message, random access response, and the like.

The network device sends data to the terminal, and the sent data is carried in the PDSCH. When different types of data are to be sent by the network device to the terminal, the network device may need to send the first PDSCH and the second PDSCH to the terminal, and the first PDSCH and the second PDSCH carry the different types of data. When the network device sends the first PDSCH and the second PDSCH to the terminal, the first PDSCH and the second PDSCH may overlap with each other.

Optionally, when the first PDSCH and the second PDSCH overlap with each other, the following two situations may be included.

In situation 1, the time domain resources of the first PDSCH and the time domain resources of the second PDSCH partially overlap with each other.

In situation 2, the time domain resources of the first PDSCH and the time domain resources of the second PDSCH completely overlap with each other.

Before the network device sends a PDSCH to the terminal, the PDSCH may be scheduled through downlink control information (DCI).

For example, when the network device sends a multicast service to the terminal, the multicast service is carried in the first PDSCH; and when the network device sends the unicast service to the terminal, the unicast service is carried in the second PDSCH.

It should be noted that the embodiments of the application only take the first PDSCH to carry the first type of service and the second PDSCH to carry the second type of service as an example for description. In some other examples, the first PDSCH may also carry the second type of service, and the second PDSCH may carry the first type of service, which is not limited in the embodiments.

In addition, when the network device sends the first PDSCH and the second PDSCH to the terminal, the network device may first send the first PDSCH to the terminal and then send the second PDSCH. Alternatively, the network device may first send the second PDSCH to the terminal, and then send the first PDSCH. Alternatively, the network device may send the first PDSCH and the second PDSCH to the terminal at the same time.

In step 502, when the time domain resources of the first PDSCH and the second PDSCH overlap, the terminal receives at least one of the first PDSCH and the second PDSCH.

Since the first PDSCH and the second PDSCH sent by the network device to the terminal carry different services, when the time domain resources of the first PDSCH and the second PDSCH overlap with each other, conflict occurs between the first PDSCH and the second PDSCH, and the terminal receives at least one of the first PDSCH and the second PDSCH.

For example, the terminal receives the first PDSCH, or the terminal receives the second PDSCH, or the terminal receives both the first PDSCH and the second PDSCH.

Optionally, when the first PDSCH and the second PDSCH overlap with each other, the following two situations may be included.

In situation 1, the time domain resources of the first PDSCH and the time domain resources of the second PDSCH partially overlap with each other.

In situation 2, the time domain resources of the first PDSCH and the time domain resources of the second PDSCH completely overlap with each other.

According to the technical solution provided by the embodiments of the application, when the time domain resources of the first PDSCH and the second PDSCH sent by the network device to the terminal overlap with each other, the terminal receives at least one of the first PDSCH and the second PDSCH, thereby proposing a new conflict resolution for receiving PDSCH, which ensures effectiveness of the communication and correct receiving of the PDSCH.

Figure 6:
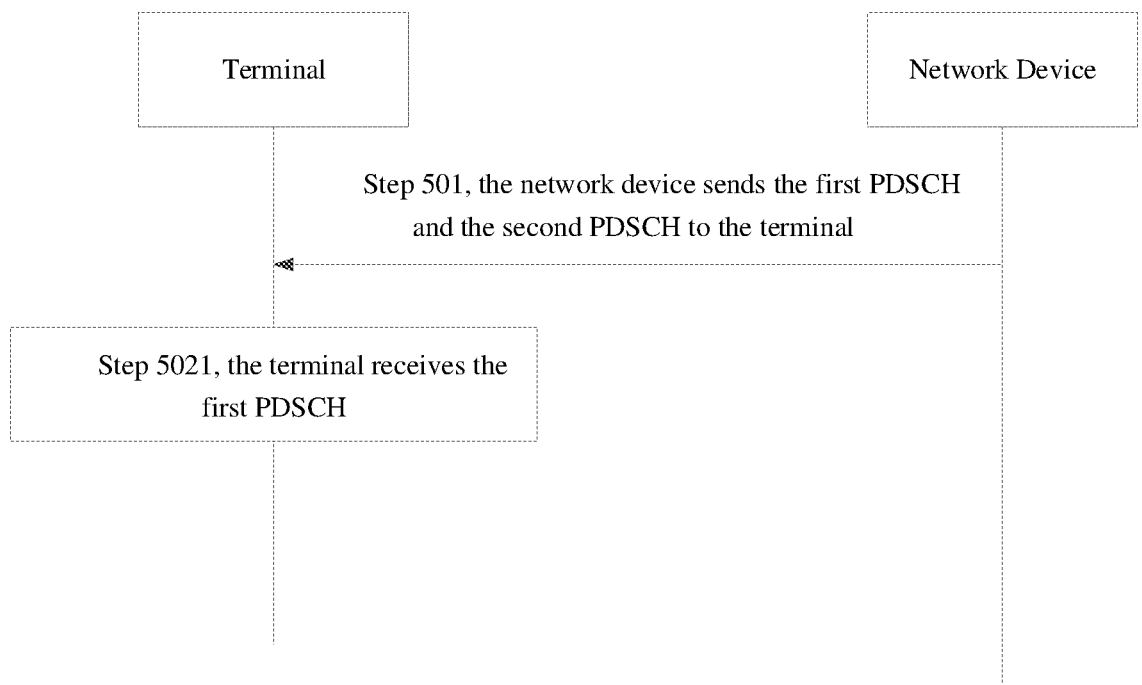
FIG. 6 illustrates a flow chart of a method for resolving service conflict according to some examples of the application.

Based on the example of FIG. 5, FIG. 6 illustrates a flow chart of a method for resolving service conflict according to some examples of the application. In these examples, step 502 is replaced by step 5021.

In step 5021, the terminal receives the first PDSCH.

When the first PDSCH and the second PDSCH overlap with each other, the terminal receives the first PDSCH.

Optionally, after the terminal receives a first DCI used for indicating the first PDSCH and a second DCI used for indicating the second PDSCH, if the first PDSCH and the second PDSCH overlap with each other, the terminal receives the first PDSCH.

For example, if a service type corresponding to the first type of service determined by the terminal according to the first DCI is MBMS service, and a service type corresponding to the second type of service determined according to the second DCI is unicast service, the terminal receives the first PDSCH.

Optionally, the network device scrambles the DCI by using an RNTI. After the terminal receives the DCI, the service type can be determined according to a scrambling mode.

For example, when the network device scrambles the DCI by using a first RNTI, for example, G-RNTI, the terminal determines that the service type carried in the PDSCH scheduled by the DCI is MBMS service. When the network device scrambles the DCI by using a second RNTI, for example, system information RNTI (SI-RNTI), the terminal determines that the service type carried in the PDSCH scheduled by the DCI is system message. When the network device scrambles the DCI by using a third RNTI, for example, cell RNTI (C-RNTI), the terminal determines that the service type carried in the PDSCH scheduled by the DCI is unicast service.

It should be noted that the embodiments of the application are described by an example, in which the terminal determines that the service type carried by the first PDSCH is multicast service or broadcast service, and receives the first PDSCH. In some other examples, if the terminal determines that the service type carried by the second PDSCH is multicast service or broadcast service, the terminal receives the second PDSCH.

It should be understood that the multicast service or broadcast service in the foregoing examples is a service that the terminal is interested in, or a service that the terminal needs to receive.

Figure 7:
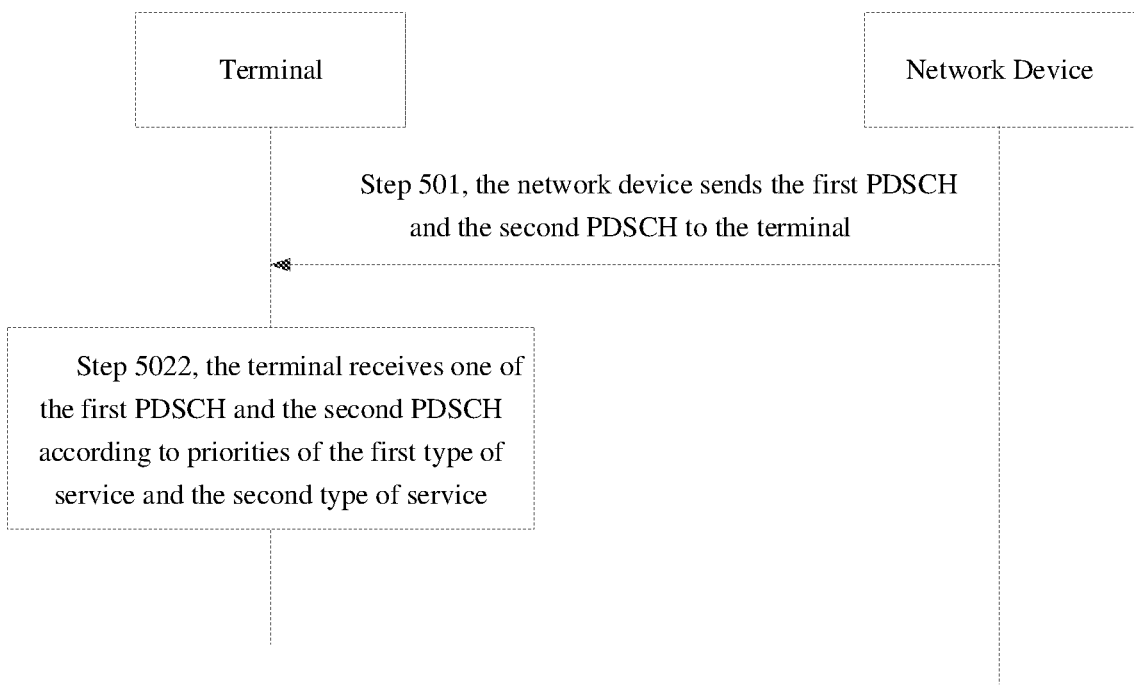
FIG. 7 illustrates a flowchart of a method for resolving service conflict according to some examples of the application.

Based on the example of FIG. 5, FIG. 7 illustrates a flowchart of a method for resolving service conflict according to some examples of the application. In these examples, step 502 is replaced by step 5022.

In step 5022, the terminal receives one of the first PDSCH and the second PDSCH according to priorities of the first type of service and the second type of service.

In some examples, both the first type of service and the second type of service have priorities, the terminal determines a priority of the first type of service and a priority of the second type of service, and receives one of the first PDSCH and the second PDSCH according to the priority of the first type of service and the priority of the second type of service.

Optionally, the priorities of the first type of service and the second type of service are configured by network device, or configured in other manners.

In some examples, the priority of a service is a priority of a logical channel corresponding to the service.

When the service is carried in multiple logical channels, the highest priority is selected from the multiple logical channels as the priority of the service.

For example, when the service is carried in logical channel 1, logical channel 2, and logical channel 3, and the priorities of logical channel 1, logical channel 2, and logical channel 3 are respectively 2, 4, and 5, then the priority 2 of logical channel 1 is used as the priority of the service.

It should be understood that the lower the priority value, the higher the priority. For example, a value range of the priority is [0,7], where 0 represents the highest priority and 7 represents the lowest priority.

Optionally, if the priority of the first type of service is higher than the priority of the second type of service, the terminal receives the first PDSCH. When the priority of the first type of service is lower than the priority of the second type of service, the terminal receives the second PDSCH.

For example, when the priority value of the first type of service is 2 and the priority value of the second type of service is 4, the terminal determines that the priority of the first type of service is higher than the priority of the second type of service, and the terminal receives the first PDSCH carrying the first type of service.

It should be noted that the embodiments of the application are described by an example, in which the PDSCH is selected according to the priority of the first type of service. In some other examples, the PDSCH may also be selected according to delay requirements or reliability requirements of the services. For example, the terminal selects a PDSCH corresponding to a service with strict requirements on reception delay or reliability, and such process is similar to selection according to the priority of the first type of service, which will no be elaborated herein.

According to the solution provided by the embodiments of the application, the terminal determines the PDSCH to be received according to the priorities of the first type of service and the second type of service, thereby ensuring that the terminal receives the PDSCH according to the priorities of services, as well as ensuring the effectiveness of communication.

In addition, the terminal receives the PDSCH corresponding to the service with the highest priority, thereby avoiding the miss of the service with a relatively high priority.

Figure 8:
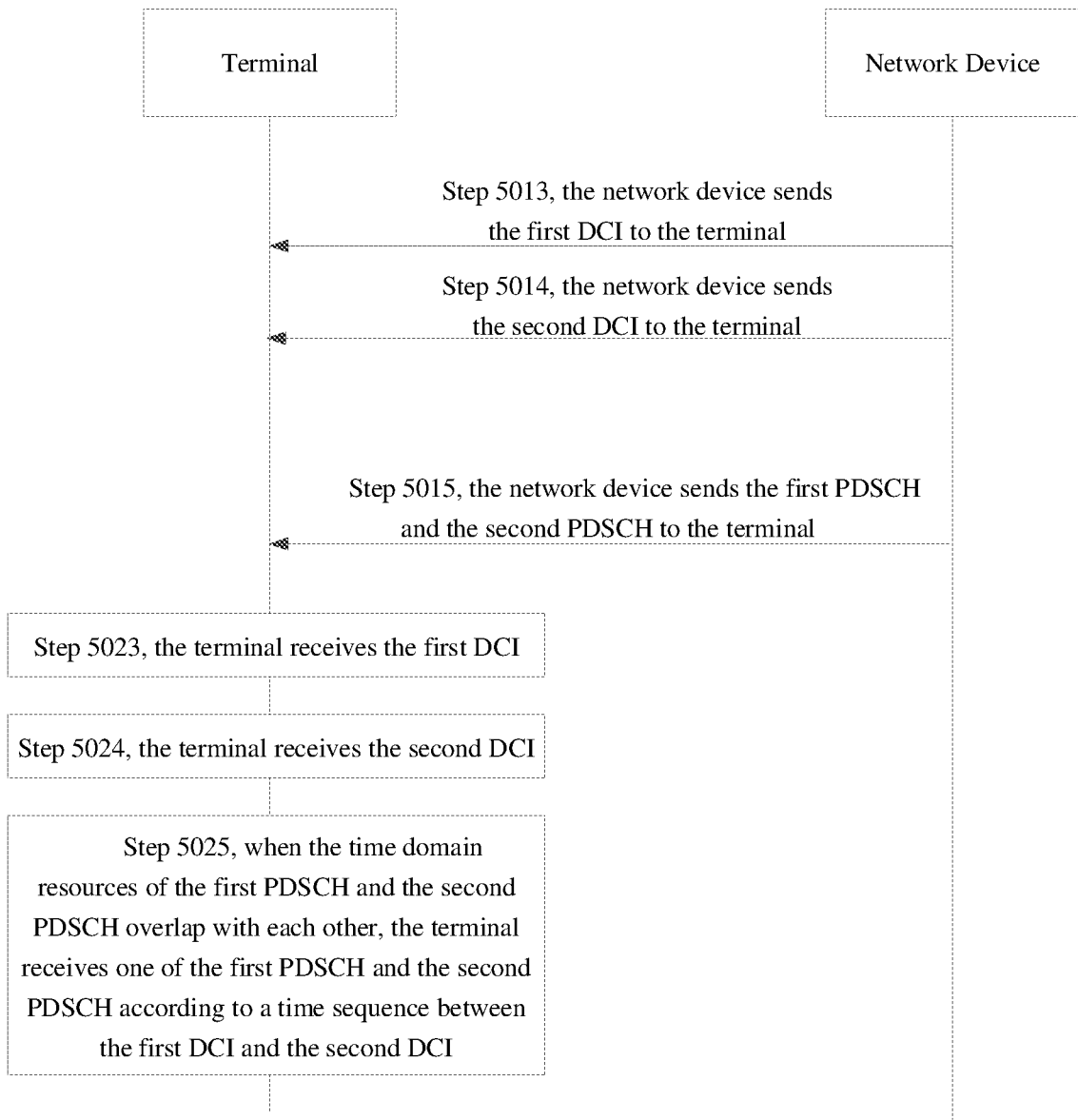
FIG. 8 illustrates a flowchart of a method for resolving service conflict according to some examples of the application.

Based on the example of FIG. 5, FIG. 8 illustrates a flowchart of a method for resolving service conflict according to some examples of the application. In these examples, step 501 is replaced by steps 5013-5015.

In step 5013, the network device sends the first DCI to the terminal.

Herein, the first DCI is used for scheduling the first PDSCH.

In step 5014, the network device sends the second DCI to the terminal.

Herein, the second DCI is used for scheduling the second PDSCH.

In step 5015, the network device sends the first PDSCH and the second PDSCH to the terminal.

Step 502 is replaced by and implemented as steps 5023-5025.

In step 5023, the terminal receives the first DCI.

In step 5024, the terminal receives the second DCI.

In step 5025, when the time domain resources of the first PDSCH and the second PDSCH overlap with each other, the terminal receives one of the first PDSCH and the second PDSCH according to a time sequence between the first DCI and the second DCI.

After the terminal receives the first DCI and the second DCI, since the time domain resources of the first PDSCH and the second PDSCH overlap with each other, the terminal determines to receive one of the first PDSCH and the second PDSCH according to the time sequence between the first DCI and the second DCI as received.

Optionally, when the first DCI is later than the second DCI, the first PDSCH is received; and when the second DCI is later than the first DCI, the second PDSCH is received.

Figure 9:
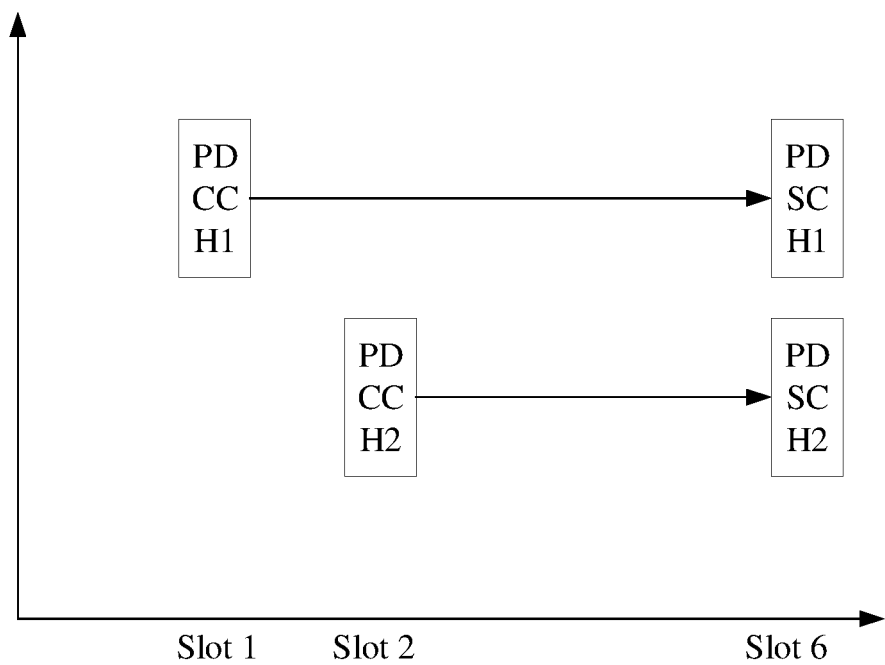
FIG. 9 is a schematic diagram of PDSCH time relationship according to some examples of the application.

For example, referring to FIG. 9, since a first physical downlink control channel (PDCCH) is located before a second PDCCH, when the first PDSCH and the second PDSCH overlap with each other, the terminal receives the second PDSCH.

According to the method provided in the embodiments of the application, when the time domain resources of the first PDSCH and the second PDSCH overlap with each other, the terminal receives one of the first PDSCH and the second PDSCH according to the time sequence between the first DCI and the second DCI, thereby ensuring the effectiveness of communication.

In addition, since the network device may consider the usage of previously scheduled services when performing a current scheduling, when the time domain resources of the first PDSCH and the second PDSCH scheduled by the network device overlap with each other, the terminal preferentially receive the PDSCH scheduled later, thereby ensuring the effectiveness of communication.

Figure 10:
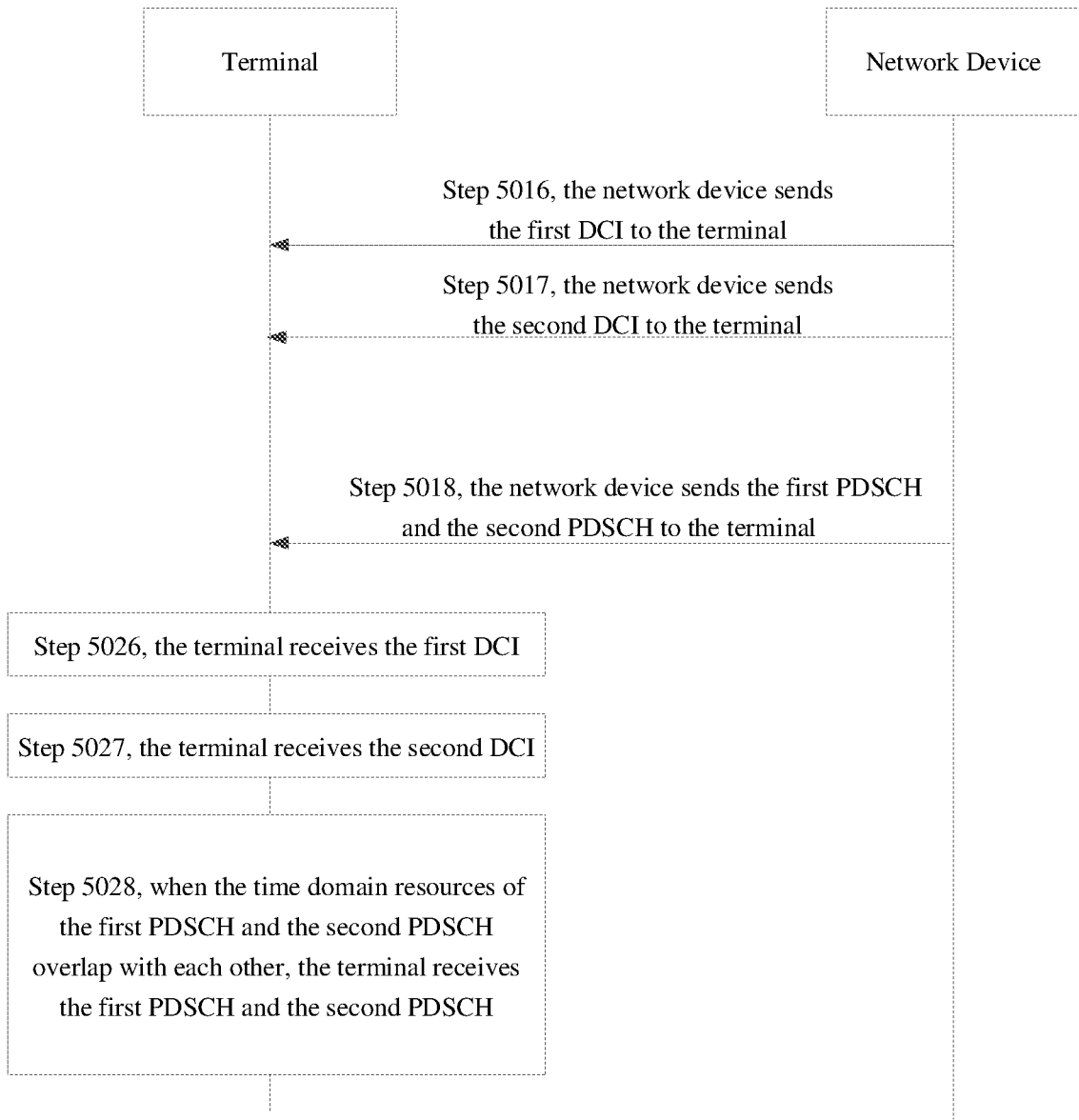
FIG. 10 illustrates a flowchart of a method for resolving service conflict according to some examples of the application.

Based on the example of FIG. 5, FIG. 10 illustrates a flowchart of a method for resolving service conflict according to some examples of the application. In these examples, step 501 is replaced by steps 5016-5018.

In step 5016, the network device sends the first DCI to the terminal.

In step 5017, the network device sends the second DCI to the terminal.

Optionally, the first DCI and the second DCI include indication information for indicating a slot offset of the terminal.

In step 5018, the network device sends the first PDSCH and the second PDSCH to the terminal.

Step 502 is replaced by and implemented as steps 5026-5028.

In step 5026, the terminal receives the first DCI.

In step 5027, the terminal receives the second DCI.

In step 5028, when the time domain resources of the first PDSCH and the second PDSCH overlap with each other, the terminal receives the first PDSCH and the second PDSCH.

The terminal determines the first PDSCH and the second PDSCH to be received according to the first DCI and the second DCI as received, and when the time domain resources of the first PDSCH and the second PDSCH overlap with each other, the terminal receives the first PDSCH and the second PDSCH.

Optionally, a PDSCH processing capability of the terminal is a newly-added processing capability, and a PDSCH processing time of the newly-added processing capability is greater than a standard value.

In some examples, when the terminal receives the PDSCH, it needs to perform channel estimation, equalization, demodulation, and decoding on the PDSCH. Because the terminal needs a certain processing time to receive the PDSCH, when the terminal receives two PDSCHs at the same time, the terminal needs longer processing time.

Accordingly, the terminal in some examples of the application has such a newly-added processing capability that the PDSCH processing time thereof is greater than the standard value, thereby ensuring that the terminal can simultaneously receive the first PDSCH and second PDSCH within the PDSCH processing time of the newly-added processing capability.

In the related art, the terminal is defined with processing capability 1 and processing capability 2, and the PDSCH processing times corresponding to processing capability 1 and processing capability 2 are different. As shown in Table 1 and Table 2, values N1 corresponding to the processing capabilities of the terminal to process the PDSCH are respectively given, and these values in the tables represent the numbers of time-domain symbols.

TABLE 1

PDSCH processing time corresponding to processing capability 1 of the terminal

| | PDSCH Decoding Time: $N_1$ (symbols) | |
| --- | --- | --- |
| $\mu$ | In the configuration "DMRS-DownlinkConfig" under DMRS mapping mode A and mapping mode B: dmrs-AdditionalPosition = pos0 | In the configuration "DownlinkConfig" under DMRS mapping mode A or mapping mode B: dmrs-AdditionalPosition ≠ pos0; or Such a high-layer parameter is not configured |
| 0 | 8 | $N_{1,0}$ |
| 1 | 10 | 13 |
| 2 | 17 | 20 |
| 3 | 20 | 24 |

TABLE 2

PDSCH processing time corresponding
to processing capability 2 of the terminal

| $\mu$ | PDSCH Decoding Time: $N_1$ (symbols)<br>In the configuration "DMRS-DownlinkConfig"<br>under DMRS<br>mapping mode A and mapping mode B:<br>dmrs-AdditionalPosition = pos0 |
|---|---|
| 0 | 3 |
| 1 | 4 |
| 2 | 9 (frequency range 1) |

Regarding the values shown in Table 1 and Table 2 as standard values, when the terminal needs to receive two PDSCHs at the same time, new processing time needs to be added on the basis of the standard value to obtain the new processing capacity, and the PDSCH processing time of the new processing capacity is greater than the standard value.

In some examples, the standard values are indicated by the values of N1 in Table 1 and Table 2.

For example, referring to Table 1, when the processing capability of the terminal is processing capability 1, in the configuration "DMRS-DownlinkConfig" under demodulation reference signal (DMRS) mapping mode A and mapping mode B: dmrs-AdditionalPosition=pos0, and the subcarrier spacing is a subcarrier spacing corresponding to $\mu$=2, the standard value is determined as 17, and the PDSCH processing time of the newly-added processing capability of the terminal is greater than 17.

Optionally, after receiving the first DCI, the terminal determines a slot offset between a slot used for carrying the first PDSCH and a slot used for carrying a first physical uplink control channel (PUCCH) according to the indication information in the first DCI, where the slot offset is greater than a first threshold, and the first PUCCH is used for carrying HARQ-ACK information corresponding to the first PDSCH.

Herein, the first DCI is used for scheduling the first PDSCH; the slot offset between the slot that carries the first PDSCH and the slot of the PUCCH that carries HARQ-ACK of the first PDSCH is used for indicating the time for the terminal to feed back the HARQ-ACK after receiving the PDSCH.

In some other examples, after receiving the first DCI, the terminal determines, from a slot offset set, the slot offset between the slot used for carrying the first PDSCH and the slot used for carrying the PUCCH of HARQ-ACK according to the indication information in the first DCI, and the slot offset is greater than the first threshold.

Optionally, the slot offset set includes a set of slot offsets {1, 2, 3, 4, 5, 6, 7, 8}.

The slot offset set may be predefined, or may be configured by the network device through configuration parameters.

For example, when the first threshold is 4, the slot offset corresponding to the value of the indication information in the first DCI can take 5, 6, 7, or 8.

Optionally, the network device generates a configuration parameter and sends the configuration parameter to the terminal. After receiving the configuration parameter, the terminal determines the slot offset set indicated by the configuration parameter.

In some examples, the configuration parameter may be dl-DataToUL-ACK, or other configuration parameters.

Optionally, a value range of the configuration parameter is [0, 31].

In some other examples, the terminal further receives configuration information sent by the network device, and determines the first threshold according to the configuration information.

Optionally, after receiving the second DCI, the terminal determines the slot offset between the slot used for carrying the second PDSCH and a slot used for carrying a second PUCCH according to the indication information in the second DCI, where the slot offset is greater than the first threshold, and the second PUCCH is used for carrying HARQ-ACK information corresponding to the second PDSCH.

The role of the second DCI is similar to that of the first DCI, and will not be repeated here.

In some examples, the second DCI is used for scheduling the second PDSCH, and the first threshold is configured by the network device.

According to the method provided in the embodiments of the application, the terminal receives the first PDSCH and the second PDSCH at the same time, thereby preventing the terminal from missing any PDSCH and ensuring the effectiveness of communication.

In addition, the terminal is defined with a new processing capability, and the slot offset between the slot used for carrying the second PDSCH and the slot used for carrying HARQ-ACK is limited, so as to ensure that the terminal has enough processing time to receive the first PDSCH and the second PDSCH, thereby ensuring the effectiveness of communication.

Figure 11:
FIG. 11 illustrates a block diagram of a communication apparatus according to some examples of the application.

FIG. 11 illustrates a block diagram of a communication apparatus according to some examples of the application, which is applicable to the terminal shown in FIG. 4, and the apparatus includes a receiving module 1101.

The receiving module 1101 is configured to receive, when time domain resources of the first PDSCH and the second PDSCH overlap with each other, at least one of the first PDSCH and the second PDSCH; where the first PDSCH carries the first type of service, and the second PDSCH carries the second type of service.

In some examples, the first type of service includes a multicast service, and the second type of service includes a service other than the multicast service.

Alternatively, the first type of service includes a broadcast service, and the second type of service includes a service other than the broadcast service.

Alternatively, the first type of service includes a multicast service and a broadcast service, and the second type of service includes a service other than the multicast service and the broadcast service.

In some examples, the receiving module 1101 is configured to receive one of the first PDSCH and the second PDSCH according to the priorities of the first type of service and the second type of service.

In some examples, the priority of the first type of service is higher than the priority of the second type of service; and the receiving module 1101 is configured to receive the first PDSCH.

In some examples, the receiving module 1101 is configured to receive one of the first PDSCH and the second PDSCH according to the time sequence between the first DCI and the second DCI.

Herein, the first DCI is used for scheduling the first PDSCH, and the second DCI is used for scheduling the second PDSCH.

In some examples, the receiving module 1101 is configured to:
receive the first PDSCH when the first DCI is later than the second DCI; and
receive the second PDSCH when the second DCI is later than the first DCI.

In some examples, a PDSCH processing capability of the terminal is a newly-added processing capability, and a PDSCH processing time of the newly-added processing capability is greater than a standard value.

In some examples, the apparatus further includes a first determining module 1102;
the receiving module 1101 is configured to receive the first DCI, and the first DCI is used for scheduling the first PDSCH; and
the first determining module 1102 is configured to determine, according to indication information in the first DCI, the slot offset between the slot used for carrying the first PDSCH and the slot used for carrying the first PUCCH, where the slot offset is greater than the first threshold, and the first PUCCH is used for carrying HARQ-ACK information corresponding to the first PDSCH.

Figure 12:
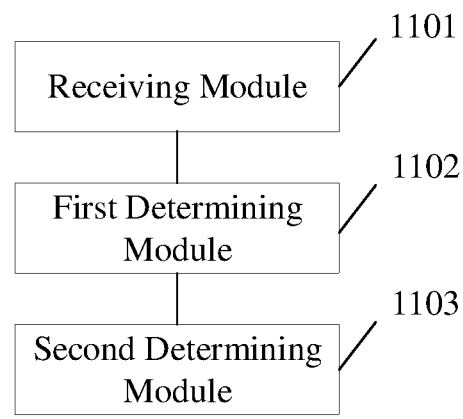
FIG. 12 illustrates a block diagram of a communication apparatus according to some examples of the application.

In some examples, referring to FIG. 12, the apparatus further includes a second determining module 1103;
the receiving module 1101 is configured to receive the second DCI, and the second DCI is used for scheduling the second PDSCH; and
the second determining module 1103 is configured to determine, according to indication information in the second DCI, the slot offset between the slot used for carrying the second PDSCH and the slot used for carrying the second PUCCH, where the slot offset is greater than the first threshold, and the second PUCCH is used for carrying HARQ-ACK information corresponding to the second PDSCH.

In some examples, the first threshold is configured by the network device; and
the receiving module 1101 is further configured to receive configuration information, and determine the first threshold according to the configuration information.

Figure 13:
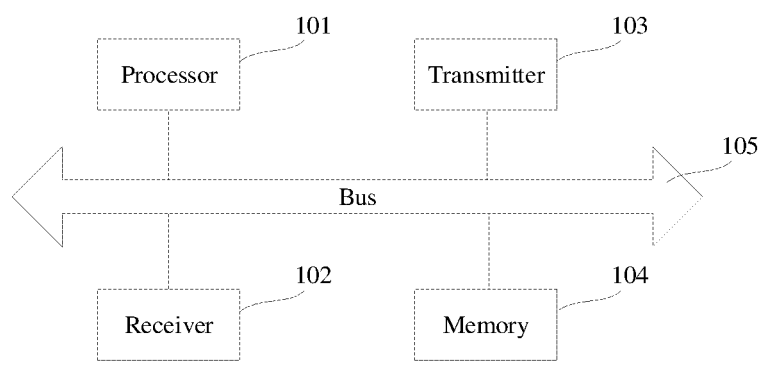
FIG. 13 illustrates a block diagram of a communication device according to some examples of the application.

FIG. 13 illustrates a block diagram of a communication device according to some examples of the application. The communication device includes a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as a communication component, and the communication component may be a communication chip.

The memory 104 is connected to the processor 101 through the bus 105.

The memory 104 may be configured to store at least one instruction, and the processor 101 is configured to execute the at least one instruction to implement various steps in the foregoing method examples.

In addition, the memory 104 may be implemented by any type of volatile or non-volatile storage device or a combination thereof. The volatile or non-volatile storage device includes, but is not limited to: magnetic or optical disk, electrically erasable and programmable read-only memory (EEPROM), erasable programmable read-only memory (EPROM), static random access memory (SRAM), read-only memory (ROM), magnetic memory, flash memory, and programmable read-only memory (PROM).

In some examples, a computer-readable storage medium is further provided. The computer-readable storage medium stores at least one instruction, at least one program, a code set, or an instruction set, and the at least one instruction, the at least one program, the code set, or the instruction set is loaded and executed by a processor to implement the method for resolving service conflict performed by the communication apparatus according to the foregoing method examples.

It should be understood by those skilled in the art that all or part of the steps in the above examples can be implemented by hardware, or by a program instructing relevant hardware. The program may be stored in a computer-readable storage medium, and the storage medium may be a read-only memory, a magnetic disk, an optical disk, or the like.

The above are only optional examples of this application and are not intended to limit this application. Any modification, equivalent replacement, improvement, and the like made within the spirit and principle of this application shall fall within the protection scope of this application.

What is claimed is:

1. A method for resolving service conflict, being applied to a terminal and comprising:
receiving, when time domain resources of a first physical downlink shared channel (PDSCH) and a second PDSCH overlap, at least one of the first PDSCH and the second PDSCH;
wherein, the first PDSCH carries a first type of service, and the second PDSCH carries a second type of service, wherein the method further comprises:
receiving a first downlink control information (DCI) and a second DCI, wherein the first DCI is used for scheduling the first PDSCH, the second DCI is used for scheduling the second PDSCH;
determining, according to indication information in the first DCI, a first slot offset between a slot used for carrying the first PDSCH and a slot used for carrying a first physical downlink control channel (PDCCH), wherein the first PDCCH is used for carrying HARQ-ACK information corresponding to the first PDSCH; and
determining, according to indication information in the second DCI, a second slot offset between a slot used for carrying the second PDSCH and a slot used for carrying a second PDCCH, wherein the second PUCCH is used for carrying HARQ-ACK information corresponding to the second PDSCH,
wherein both the first slot offset and the second slot offset are greater than a first threshold configured by a network device, and receiving the at least one of the first PDSCH and the second PDSCH comprises receiving the first PDSCH and the second PDSCH.

2. The method as claimed in claim 1, wherein,
the first type of service comprises a multicast service, and the second type of service comprises a unicast service.

3. The method as claimed in claim 1, further comprising at least one of:
determining, based on a scrambling mode of the first DCI used for scheduling the first PDSCH, that the first PDSCH carries the first type of service; or
determining, based on a scrambling mode of the second DCI used for scheduling the second PDSCH, that the second PDSCH carries the second type of service.

4. The method as claimed in claim 3, further comprising at least one of:
  determining, when the first DCI is scrambled by using a group radio network temporary identifier (G-RNTI), that the first type of service comprises a multicast service; or
  determining, when the second DCI is scrambled by using a cell RNTI (C-RNTI), that the second type of service comprises a unicast service.

5. The method as claimed in claim 1, wherein receiving at least one of the first PDSCH and the second PDSCH further comprises:
  receiving one of the first PDSCH and the second PDSCH according to priorities of the first type of service and the second type of service.

6. The method as claimed in claim 5, wherein a priority of the first type of service is higher than a priority of the second type of service, and
  receiving one of the first PDSCH and the second PDSCH according to the priorities of the first type of service and the second type of service comprises:
  receiving the first PDSCH.

7. The method as claimed in claim 1, wherein receiving at least one of the first PDSCH and the second PDSCH further comprises:
  receiving one of the first PDSCH and the second PDSCH according to a time sequence between the first DCI and the second DCI.

8. The method as claimed in claim 7, wherein receiving one of the first PDSCH and the second PDSCH according to the time sequence between the first DCI and the second DCI comprises:
  receiving the first PDSCH when the first DCI is later than the second DCI; and
  receiving the second PDSCH when the second DCI is later than the first DCI.

9. The method as claimed in claim 1, wherein a PDSCH processing capability of the terminal is a newly-added processing capability.

10. A terminal, comprising:
  a processor;
  a transceiver connected to the processor; and
  a memory configured to store executable instructions of the processor;
  wherein, the processor, through loading and executing the executable instructions, is configured to:
  receive, via the transceiver, at least one of a first physical downlink shared channel (PDSCH) and a second PDSCH when time domain resources of the first PDSCH and the second PDSCH overlap;
  wherein, the first PDSCH carries a first type of service, and the second PDSCH carries a second type of service,
  wherein the processor is further configured to:
  receive, via the transceiver, a first downlink control information (DCI) and a second DCI, wherein the first DCI is used for scheduling the first PDSCH, the second DCI is used for scheduling the second PDSCH;
  determine, according to indication information in the first DCI, a first slot offset between a slot used for carrying the first PDSCH and a slot used for carrying a first physical downlink control channel (PDCCH), wherein the first PDCCH is used for carrying HARQ-ACK information corresponding to the first PDSCH; and
  determine, according to indication information in the second DCI, a second slot offset between a slot used for carrying the second PDSCH and a slot used for carrying a second PDCCH, wherein the second PUCCH is used for carrying HARQ-ACK information corresponding to the second PDSCH;
  wherein both the first slot offset and the second slot offset are greater than a first threshold configured by a network device, and the processor is specifically configured to receive the first PDSCH and the second PDSCH.

11. The terminal as claimed in claim 10, wherein,
  the first type of service comprises a multicast service, and the second type of service comprises a unicast service.

12. The terminal as claimed in claim 10, wherein the processor is further configured to:
  determine, based on a scrambling mode of the first DCI used for scheduling the first PDSCH, that the first PDSCH carries the first type of service;
  and/or determine, based on a scrambling mode of the second DCI used for scheduling the second PDSCH, that the second PDSCH carries the second type of service.

13. The terminal as claimed in claim 12, wherein the processor is further configured to:
  determine, when the first DCI is scrambled by using a group radio network temporary identifier (G-RNTI), that the first type of service comprises a multicast service; or
  determine, when the second DCI is scrambled by using a cell RNTI (C-RNTI), that the second type of service comprises a unicast service.

14. The terminal as claimed in claim 10, wherein a PDSCH processing capability of the terminal is a newly-added processing capability.

15. A non-transitory computer-readable storage medium, wherein executable instructions are stored in the computer-readable storage medium, the executable instructions are loaded and executed by a processor to implement a method for resolving service conflict, and the method comprises:
  receiving, when time domain resources of a first physical downlink shared channel (PDSCH) and a second PDSCH overlap, at least one of the first PDSCH and the second PDSCH;
  wherein, the first PDSCH carries a first type of service, and the second PDSCH carries a second type of service,
  wherein the method further comprises:
  receiving a first downlink control information (DCI) and a second DCI, wherein the first DCI is used for scheduling the first PDSCH, the second DCI is used for scheduling the second PDSCH;
  determining, according to indication information in the first DCI, a first slot offset between a slot used for carrying the first PDSCH and a slot used for carrying a first physical downlink control channel (PDCCH), wherein the first PDCCH is used for carrying HARQ-ACK information corresponding to the first PDSCH; and
  determining, according to indication information in the second DCI, a second slot offset between a slot used for carrying the second PDSCH and a slot used for carrying a second PDCCH, wherein the second PUCCH is used for carrying HARQ-ACK information corresponding to the second PDSCH,
  wherein both the first slot offset and the second slot offset are greater than a first threshold configured by a network device, and receiving the at least one of the first PDSCH and the second PDSCH comprises: receiving the first PDSCH and the second PDSCH.

16. The medium as claimed in claim 15, wherein,
the first type of service comprises a multicast service, and
the second type of service comprises a unicast service.

17. The medium as claimed in claim 15, wherein the method further comprises at least one of:
determining, based on a scrambling mode of the first DCI used for scheduling the first PDSCH, that the first PDSCH carries the first type of service; or
determining, based on a scrambling mode of the second DCI used for scheduling the second PDSCH, that the second PDSCH carries the second type of service.

18. The medium as claimed in claim 17, wherein the method further comprises at least one of:
determining, when the first DCI is scrambled by using a group radio network temporary identifier (G-RNTI), that the first type of service comprises a multicast service; or
determining, when the second DCI is scrambled by using a cell RNTI (C-RNTI), that the second type of service comprises a unicast service.

19. The medium as claimed in claim 15, wherein a PDSCH processing capability of the terminal is a newly-added processing capability.

\* \* \* \* \*